Dec. 21, 1965  W. FLAMING  3,224,108
SYSTEM AND MEANS FOR AUTOMATICALLY AIR DRYING VEHICLES
Filed July 2, 1962  2 Sheets-Sheet 1

INVENTOR,
BY WALTER FLAMING;
ATTORNEY

Dec. 21, 1965 W. FLAMING 3,224,108
SYSTEM AND MEANS FOR AUTOMATICALLY AIR DRYING VEHICLES
Filed July 2, 1962 2 Sheets-Sheet 2

INVENTOR,
BY WALTER FLAMING;
ATTORNEY

United States Patent Office 3,224,108
Patented Dec. 21, 1965

3,224,108
SYSTEM AND MEANS FOR AUTOMATICALLY
AIR DRYING VEHICLES
Walter Flaming, 1601 Caspian Ave., Long Beach 13, Calif.
Filed July 2, 1962, Ser. No. 206,734
3 Claims. (Cl. 34—87)

The present invention relates to an automatic means whereby pressure air is directed against the top surface of a vehicle which has been washed for the purpose of removing excess liquid and drying the vehicle.

Specifically, the invention is so constructed and arranged that air under pressure is directed against the vehicle top, such as the hood, windshield, canopy and deck so as to remove liquid therefrom for drying purposes. In order to accomplish this function, the pressure air must be maintained close to the surface being dried, and the construction is such that the invention will follow the contour of the car and specifically the hood, windshield, top and rear deck.

An object of the invention is to provide a pressure air dryer for vehicles which includes a nozzle through which pressure air is directed against the vehicle. The arrangement is such that the nozzle follows spacedly the contour of the vehicle from the hood to the rear deck, as the vehicle is moved relative to the nozzle and without the nozzle directly engaging any part of the vehicle.

A further object of the invention is to provide an air dryer means and system for vehicles which is automatically moved over the vehicle as the vehicle travels in one direction, the system and means adapting itself to the contour of the vehicle from hood to rear deck.

A further object is a system and means for air drying a vehicle after the washing thereof which may be automatically or manually controlled.

A further object is an air pressure dryer for the top of vehicles which is fool proof in operation, efficient, inexpensive in cost of manufacture and superior to known systems and means for air drying vehicles now known to the inventor.

With the above mentioned and other objects in view, the invention consists in the novel and useful provision, formation, construction, association and relative arrangement of parts, members and features, all as shown in certain embodiments in the accompanying drawings, described generally, and more particularly pointed out in the claims.

Figure 1:
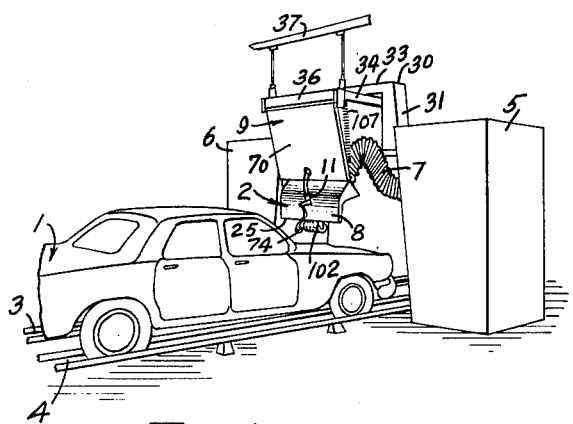
FIGURE 1 is a fragmentary, perspective view showing the invention directly above the hood of a vehicle.

Referring now to the drawings, and specifically to FIGURE 1 wherein is illustrated a vehicle 1 which has been washed and is now ready for drying, approaching the automatic air dryer of the invention and designated as 2. It will be noted that the vehicle is being guided by a pair of wheel ways 3 and 4 as it traverses the automatic wash system. On opposite sides of the ways 3 and 4 are positioned cabinets 5 and 6 one of which, 5, houses an air blower of some form. Air from the blower is delivered through a flexible hose 7 to an air nozzle 8, the nozzle 8 taking the form shown in the several figures of the drawings so as to transversely overlie the vehicle 1 as the vehicle traverses the ways 3 and 4. Thus, the eduction, or mouth end of the nozzle, may have a width equal to the width of the vehicle. The eduction end of the nozzle is adapted to be maintained automatically, above the vehicle, such as the hood, windshield, top and rear decks as the vehicle traverses the ways 3 and 4. To accomplish this I provide suitable means designated generally as 9 for supporting the nozzle and permitting elevation and lowering of the nozzle relative to the vehicle as the vehicle traverses the ways. Means 10 (FIGURES 2 and 4) is provided for moving the means 9 so as to elevate or lower the nozzle. The means 10 in turn, is controlled as to movement by actuation of a pilot valve 11 which, in turn, controls a master valve 12 whereby the means 10 will raise or lower the nozzle 8. The plumbing for the system which interconnects the pilot valve, the master valve, and means 10, will be described after a detailed description of various of the elements 8, 9, 10, 11, and 12.

Figure 4:
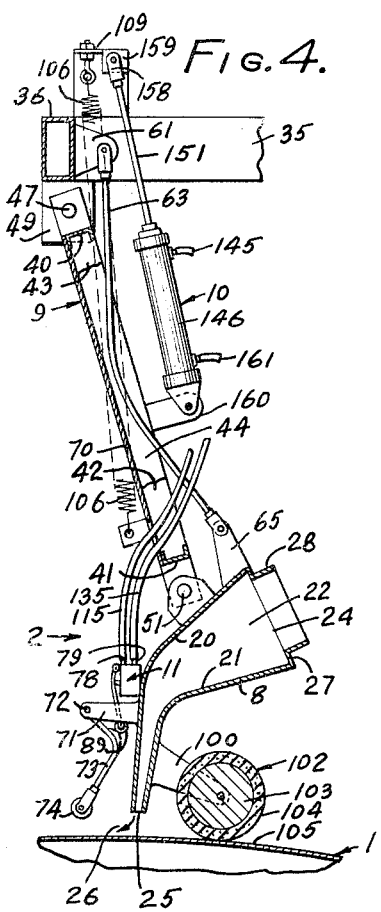
FIGURE 4 is a fragmentary sectional view taken on the line 4—4 of FIGURE 3, and on an enlarged scale.

The nozzle 8 has top and bottom walls 20 and 21 and enclosing end walls 22 and 23, the walls 20 and 21 converging from the base or air induction end 24 to the air eduction end 25 which constitutes the mouth end of the nozzle. The walls 20 and 21 are bent so that the induction or base end is in angular relationship to the mouth end whereby air, under pressure, is directed against the object upon which pressure air is to impinge, as shown in FIGURE 4, at 26. The base or induction end of the nozzle is provided with a back wall 27 having a flange 28 intermediate its length and width, which flange receives one end of the flexible hose 7, which hose connects with a blower in casing 5.

Figure 2:
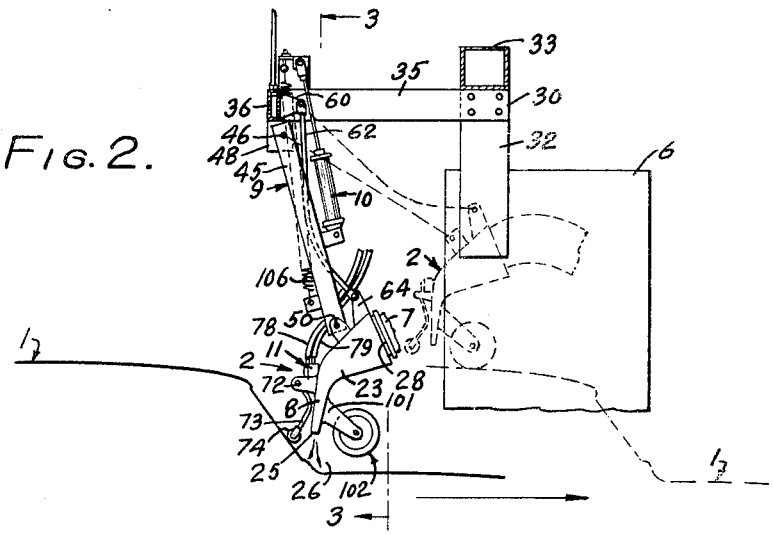
FIGURE 2 is a fragmentary, partially sectional side elevation of certain mechanism of the invention and showing the mechanism in two positions relative to the vehicle.

Referring to FIGURES 1 and 2, the housings 5 and 6 are interconnected by framing 30 which includes columns 31 and 32 secured to the housings 5 and 6 with a transverse beam 33 secured to the upper ends of the columns. This framing has secured thereto a pair of parallel beams 34 and 35 extending outwardly from one side of the framing 30, which beams 34 and 35 at their outer ends are interconnected by a transverse beam 36. A further support structure may be provided for the outer ends of the beams 34 and 35, as shown at 37.

Figure 5:
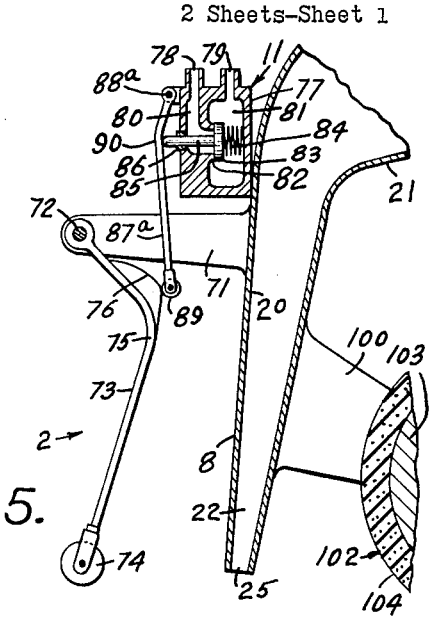
FIGURE 5 is a fragmentary, transverse sectional view on an enlarged scale of a nozzle through which pressure air is directed together with a pilot valve and trip arm for actuating the pilot valve, being members used in the practice of the invention.
Figures 6, 8:
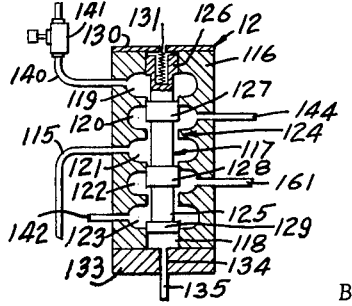
FIGURE 6 is illustrative of movement of the nozzle through which pressure air is directed.
FIGURE 8 is a transverse sectional view of a master control valve used in the practice of the invention and in a moved position from that shown for the valve in FIGURE 7; and, FIGURE 9 is a longitudinal sectional view of valve construction used for the pilot valve shown in FIGURE 5.
Figure 3:
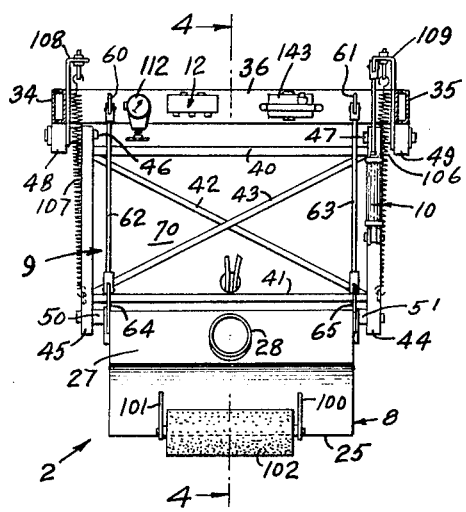
FIGURE 3 is a fragmentary, sectional view on the line 3—3 of FIGURE 2.

The means 9 for supporting the nozzle extends between the beams 34, 35, and 36, and as shown in FIGURES 3 and 4, the supporting means 9 includes a framing having upper and lower horizontal channel members 40 and 41, with diagonal bracing therebetween, as shown at 42 and 43, all connected to parallel arms 44 and 45. The upper end of each arm 44 and 45 is pivotally secured by pins 46 and 47, to members 48 and 49 which depend from the beams 34 and 35. The opposite ends of the arms 44 and 45 are pivotally secured to lugs 50 and 51, the lugs being secured at opposite ends or sides of the nozzle 8. The transverse beam 36 is provided with a pair of spaced apart lugs 60 and 61 on the inner side of said beam and a pair of arms or links 62 and 63 are each pivoted at the upper ends thereof to the lugs 60 and 61, the lower ends of said links or arms being pivoted to lugs 64 and 65 secured to ends or sides of the nozzle. The arms or links 62 and 63 are structurally bent in the manner shown in FIGURE 4 for the purpose of avoiding the means 10 during movement of the means 9. The mean length between the pivotal points for the arms or links 62 and 63 and the length between the pivot points for the arms 44 and 45 is the same as is likewise the upper and lower pivot point spacing whereby upon swing movement of the nozzle, parallel movement of the arms occurs to maintain the mouth or eduction end 25 of the nozzle directly over the surface upon which pressure air is directed, as shown in FIGURE 6. The construction is essentially a pantograph and produces parallel movement of the links or arms. For the purpose of enhancing appearance and, likewise, protecting certain of the movable parts, a front panel 70 is secured to the members 40 and 41. Extending outwardly from wall 20 of the nozzle 8 is a bracket arm 71, FIGURES 4 and 5. This bracket arm is positioned intermediate the ends or sides of the nozzle and has pivotally secured thereto at 72 one end of a trip arm 73, the opposite end of the trip arm carrying a roller 74. The trip arm is structurally bent at 75 and carries an edge cam 76. Secured above the bracket arm 71 to the nozzle is the pilot valve 11.

Figure 9:
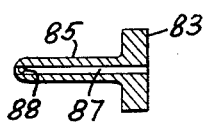

The pilot valve includes a housing or casing 77 having inlet and outlet ports 78 and 79 which communicate with chambers 80 and 81 with a valve seat at 82 between said chambers. A valve 83 is urged to seat by means of a spring 84, the valve is provided with a stem 85 passed through a gland 86 and extending outwardly of the casing. The valve stem and valve, FIGURE 9, are provided with a longitudinal bore 87, the valve stem being transversely bored at 88, the bore 88 intersecting the bore 87. The valve 83 is actuated by an arm 87a pivoted at one end 88a to the valve housing, the opposite end of the arm 87a carrying a roller 89 adapted to engage the edge cam 76. The arm 87a is slightly bent at 90. Obviously when the arm 73 is moved so that the roller 89 of arm 87a is moved counterclockwise by the cam 76, the valve stem 85 is moved inwardly of the housing to unseat the valve 83. Normal position for the arms 73 and 87a is that shown in FIGURE 5, the valve being seated under spring pressure. As shown in FIGURES 2, 4, and 5, the roller 74 is forward of and below the mouth or eduction end 25 of the nozzle. The rear wall 21 of the nozzle 8 carries a pair of separated bracket arms 100 and 101 between which is journalled a soft surfaced roller 102. Thus the roller may have a cylindrical core 103, the surface of which carries a rubber tread 104. The roller lies intermediate the ends of the nozzle and has a diameter sufficient to maintain the mouth end 25 of the nozzle above a surface as the roller rides upon said surface, as, for instance, illustrated in FIGURE 4 at 105.

It is important to note at this point that the nozzle receives air from an air compressor through the flexible tube 7 for direct impingement of the air against the upper surfaces of a vehicle. Contact of the moving vehicle with roller 74 on trip arm 73 actuates the arm 87a to open the valve 83, whereupon, as illustrated in FIGURE 2, the nozzle is raised by the pantograph arrangement of the arms and links which constitute the nozzle support, to wit: the means 9, by actuation of the means 10. The nozzle and associated elements naturally have weight and the nozzle will tend to return to a position such as indicated in FIGURES 1, 2, and 4, although I prefer to counter balance the weight of the nozzle and associated parts by means of elongated springs of which there are a pair for each end, as shown at 106 and 107, the upper ends of the springs being secured to brackets 108 and 109 secured to the beams 48 and 49 while the lower ends of said springs are attached to the lower ends of the arms 44 and 45. This counter balancing allows the nozzle to sink gradually to its lowermost position, and the arrangement is such that when the valve 83 is opened resultant upon the roller 74 contact-ing, say, the windshield, as shown in FIGURE 2, the air is directed to the means 10 in such a manner as to raise the nozzle slightly, as indicated in the full and dotted line positions of FIGURE 6. All of this will be detailed in the statement of operation.

Continuing with the description of the means for raising the nozzle, the system includes, in addition to the pilot valve 11 and the means 10, the master control valve 12 which is actuated when the pilot valve 11 is opened. Thus, referring to FIGURE 7, a source of air under pressure is directed into pipe 110 for passage through a filter 111, a controllable pressure valve 112, an oiler 113 into piping 114 which joins piping 115, which piping 115 leads at one end to the inlet port 78 of the pilot valve while the opposite end of pipe 115 leads to the master control valve.

Figure 7:
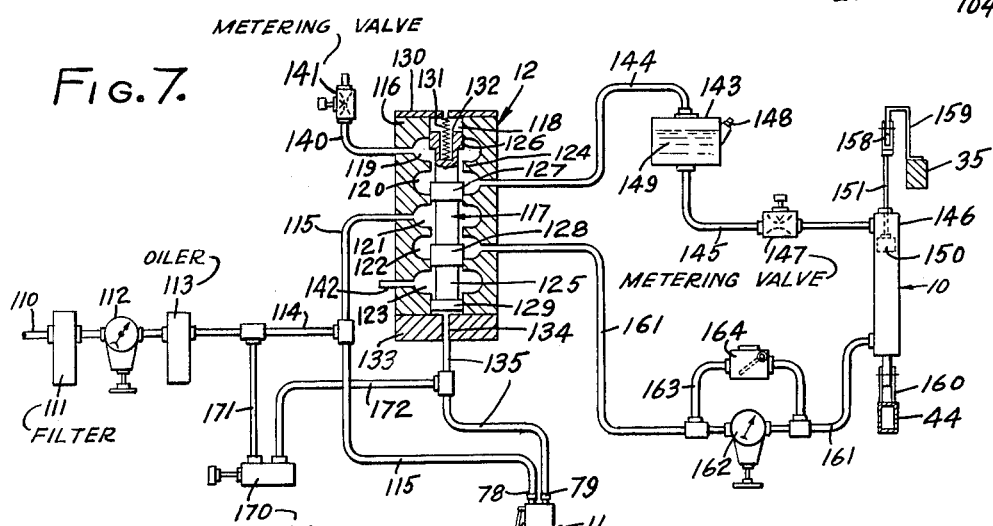
FIGURE 7 is a diagrammatic, partially sectional view of elements used in the practice of the invention and associated plumbing therefor.

The master control valve 12 includes a housing or cylinder 116 within which is a piston valve 117. The valve cylinder has an axial bore 118 and a series of spaced concentric chambers 119 to 123 inclusive. The chambers are of identical form and size and of greater diameter than the diameter of the bore and thereby provide separation walls between the chambers, which walls are designated generally as 124. The walls form axial ports for communication between the chambers and all chambers communicate at the axis thereof if the piston was not within the axial bore. The piston stem 125 is provided with valve portions 126 to 129 inclusive which fit closely within the seat portions, to wit; the separation walls of the cylinder or housing. The piston when moved to a seated position will close communication between certain of the chambers or permit communication between certain chambers while closing communication between certain other chambers, as hereinafter detailed in the statement of operation. An end cap or plate 130 closes the cylinder and a coil spring 131 between the end plate and the piston normally urges the piston in one direction. The piston is bored at one end to receive the spring as shown at 132. The opposite end of the cylinder is closed by a plate 133 and said plate is provided with a central bore 134 for reception of one end of a pipe 135. The pipe 135 leads to the port 79 of the pilot valve 11. Detailing the chambers of the master control valve, the chamber 119 through suitable piping 140 leads to an exhaust metering valve 141. This metering valve is of standard form as generally used in the industry and meters the air flow therethrough. Chamber 121 is in communication with the pressure air through pipe 115 while chamber 123 connects with an air exhaust pipe 142. Chamber 120 is connected with a hydraulic chamber member 143 by pipe 144. The hydraulic chamber 143 connects by pipe 145 with the upper end of cylinder 146 of the means 10, there being a flow control valve 147 in the piping 145. The hydraulic chamber member 143 includes a suitable tank having a filler plug 148 whereby the tank may receive oil or other suitable liquid 149. The arrangement is such that when the apparatus or system of FIGURE 7 is in operation, air under pressure is directed through pipe 144 to pressurize the oil to force the same through the pipe 145 into the upper end of cylinder 146. The cylinder 146 has within the same a piston 150 and the oil when received under pressure within the cylinder impinges against the piston to force the piston normally downwardly within the cylinder. The piston has the usual piston arm 151 passed through the cylinder head, the arm carrying a clevis 158 which is attached to a bracket 159 mounted upon beam 35. The opposite end of the cylinder is rockably pinned to bracket 160 (FIGURE 4) which extends from arm 44. Piping 161 leads from the cylinder 146 through a pressure regulating valve 162 to chamber 122. Piping 163 connects piping 161 on opposite sides of valve 162, and piping 163 includes within its length a one way valve 164. A manually controlled valve is provided at 170 which has connection through piping 171 and 172 with lines 114 and 135. This manual valve may be operated if the pilot valve is not actuated to control the raising and lowering of the nozzle. This valve is of the plunger type and is of standard form such as now known in the industry.

The operation, uses and advantages of the invention described are as follows.

It is to be noted, upon reference to FIGURE 3, that various parts of the plumbing system may be secured to the beam 36 which permits ready access to said parts by an operator. The valve 112 which is within the pressure air line may be set for any pressure desired for the so-called raise cycle of the nozzle, such as between 120 and 140 p.s.i. The filter 111 performs its usual function in the air line and the oiler 113 allows the air in its flow to pick up a mist of oil for lubricating the pilot valve and the master control valve. When the pilot valve is in the position shown in FIGURE 1, the roller 74 is out of contact with the vehicle, although the mouth of the nozzle is directly above the hood, and air is directed under pressure from a suitable blower through said nozzle. The nozzle follows the contour of the vehicle and when the roller 74 engages the hood or the windshield of the vehicle, the valve 83 of the pilot valve is unseated and air under pressure then moves through the valve housing into line 135 to direct pressure air against the one end of the piston 117 moving the piston to the position shown in FIGURE 8. It will be noted, before describing FIGURE 8, that in FIGURE 7 pressure air in line 115 enters chamber 121, thence into chamber 122 which allows a certain amount of air to flow through pipe 161 to valves 164 and 162 thence into the cylinder 146 at one side of the piston 150. However, the valve 164 blocks air passage and such air passage as is allowed to move is passed through the pressure regulating valve 162 which is set usually at 20 to 30 p.s.i. When the pilot valve is open, the piston of the master control valve is moved to the position of FIGURE 8 whereupon the valve portion 127 closes passage between chambers 119 and 120, allows passage between chambers 120 and 121, and valve portion 128 permits communication between chambers 122 and 123. Thus, pressure air directed to chamber 121 is then directed into chamber 120, through pipe 144 to pressurize tank 143 and cause movement of oil under pressure through flow control valve 147, which valve 147 allows free flow of the oil into the cylinder 146 above the piston 150. As the position of the piston arm is fixed by the bracket 159 attached to the beam 35, movement of the piston will raise the cylinder 146 and in so doing, move the supporting arms for the nozzle, as illustrated in FIGURE 6 by the full and dotted lines. However, such action is momentary as the striking of the roller against an object, such as the windshield, momentarily opens the pilot valve causing the nozzle to move away from the windshield, and as the air then bleeds through the stem of the pilot valve; i.e., through bores 87 and 88, the arms and links supporting the nozzle again allow the nozzle to move downwardly whereby the roller 74 may again engage the windshield. Thus, a series of intermittent movements allows a balanced engagement of the roller 74 with some object such as the windshield so that the mouth or outlet of the nozzle is always maintained close to the object against which air under pressure is being directed. This opening and closing of the pilot valve will permit the pantograph arrangement for the arms and links which support the nozzle to raise the nozzle by moving the arms and the links sufficient to permit the roller 102 to engage the car such as the top thereof as the car moves forwardly, as shown in FIGURE 2 in the dotted line position therefor, and air is directed under pressure for impingement against the car surfaces. It will be seen that the drop of the nozzle is regulated by the valve 162 and the bypass valve 164 which will open for return flow of air. The return flow of oil from above the piston to the tank 143 is controlled by the flow control valve 147 which allows free flow of oil under pressure into the cylinder and a return flow therefrom which is gradual, depending upon the regulation of this valve. Hence, the nozzle is at all times delicately balanced and ready for movement under spring tension counterbalance and air and oil flow.

The valve at 141 is of the exhaust metering type to allow air to escape through the line 144 from the tank 143 when the piston is in the position shown in FIGURE 7 and to block entrance thereto when the piston 117 is in the position of FIGURE 8. When the piston is in the position of FIGURE 8, air under pressure is directed against the oil in tank 143, it being observed that the pipe 161 which connects with valve 162 leads to chamber 122 and to exhaust through pipe 142. I have thus accomplished a delicately balanced raise and drop cycle for the nozzle and one that maintains the eduction or mouth end of the nozzle spaced above the top of the car whether it be the rear deck, top, or hood, with assurance that there will be no damage or scratching of the paint on the metal body.

As shown in FIGURES 2, 4 and 5, the nozzle is not quite vertical but has a slight inclination forwardly or in the direction of the advancing vehicle. This slight inclination gives rise to a component of force in the air jet issuing from the nozzle which pushes ahead of it any water standing on the vehicle, and even lifts water lying on the windshield (at the same time rapidly evaporating it). The result is that any water encountered by the air jet is positively prevented from trickling down past the nozzle onto surfaces of the vehicle which the air jet has previously dried.

While I have shown the nozzle as arranged for directing pressure air on to the top of the vehicle as the vehicle moves therebeneath, it is evident that nozzles may be placed at sides of the vehicles to follow the contour of the vehicle.

I claim:

1. Apparatus for drying the upper surfaces of freshly washed vehicles during movement thereof comprising, in combination, a source of compressed air; stationary framing beneath which vehicles may be moved; a nozzle assembly including an air-jet-discharging nozzle extending transversely of and above the vehicle, and a pantograph support for the nozzle; said nozzle having induction and eduction ports; means connecting the induction port with the source of compressed air; the eduction port being elongated transverse to the direction of movement of the vehicles and directing a jet of compressed air generally downwardly upon the upper surfaces of a vehicle passing beneath; said pantograph support being pivoted to and suspended from said framing and in turn pivotally suspending said nozzle, and being so constructed and arranged that the nozzle may be swung in planes parallel to the direction of movement of the vehicles being dried, and when so swung, the pantograph support maintains the nozzle always in the same angular position, which is nearly vertical; a trip arm pivotally mounted on the nozzle and having a roller at its lower end always disposed below the lowest part of the nozzle and always in advance of the nozzle, so that said roller, not the nozzle, will be contacted by a part of the vehicle moving beneath; a pilot valve mounted on the nozzle assembly above the trip arm; means responsive to swinging of said trip arm by said vehicle contact to operate said pilot valve; a pneumatic-hydraulic system including a hydraulic cylinder and piston assembly connected to the framing at its upper end and to the nozzle assembly at its lower end and adapted to raise and lower the nozzle assembly relative to the vehicle beneath; and valves and piping connecting said pilot valve with said pneumatic-hydraulic system to effect automatic and rapid elevation of the nozzle assembly whenever the roller is struck by a part of a moving vehicle; automatic means being provided as part of said system to cause the nozzle assembly to descend slowly after said elevation.

2. The invention defined in claim 1, wherein the pantograph support includes two like pantographs connected to opposite ends of the nozzle and swingable in parallel vertical planes to maintain the nozzle transverse of the vehicle, with its eduction port always substantially horizontal; and a second roller adapted to protect the vehicle from being struck by the nozzle, said second roller being carried in a fixed position on the nozzle and being disposed to the rear of and partly below the nozzle and extending transversely of the vehicle.

3. The invention defined in claim 1, wherein the nozzle is slightly inclined forwardly or in the direction of the advancing vehicle, so that there is a component of force in the air jet issuing therefrom which pushes ahead of it water standing on the moving vehicle, thus preventing such water from trickling down past the nozzle onto surfaces previously dried.

References Cited by the Examiner
UNITED STATES PATENTS

| | | | |
|---|---|---|---|
| 223,464 | 1/1880 | Bailey | 91—4 |
| 2,440,157 | 4/1948 | Rousseau | 34—229 |
| 2,490,823 | 12/1949 | Manning | 91—4 |
| 2,492,049 | 12/1949 | Krone et al. | 137—615 |
| 2,680,304 | 6/1954 | Herbert | 34—87 |
| 2,840,037 | 6/1958 | Verba | 118—323 X |
| 2,904,894 | 9/1959 | Hurst | 34—229 X |
| 2,949,678 | 8/1960 | Anderson | 34—229 X |

WILLIAM F. O'DEA, *Primary Examiner.*

NORMAN YUDKOFF, *Examiner.*

J. P. ROBINSON, A. D. HERRMANN,
*Assistant Examiners.*